US 6,899,366 B2

(12) United States Patent
Krueger et al.

(10) Patent No.: US 6,899,366 B2
(45) Date of Patent: May 31, 2005

(54) VEHICLE STORAGE AND VENTILATION SYSTEM

(75) Inventors: Eberhard Krueger, Lake Orion, MI (US); Scott B Perry, Riverview, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/738,602

(22) Filed: Dec. 17, 2003

(65) Prior Publication Data

US 2005/0088005 A1    Apr. 28, 2005

Related U.S. Application Data

(60) Provisional application No. 60/513,645, filed on Oct. 23, 2003.

(51) Int. Cl.[7] .................................................. B60N 3/12
(52) U.S. Cl. .................. 296/37.8; 296/208; 296/37.16
(58) Field of Search ............................. 296/37.8, 208, 296/107.08, 37.14, 190.09, 37.16, 37.1; 454/144, 454/143, 162

(56) References Cited

U.S. PATENT DOCUMENTS

| 2,115,472 | A | * | 4/1938 | Allston ........................ 454/144 |
| 4,752,096 | A | * | 6/1988 | Ishikawa .................. 296/37.16 |
| 4,763,564 | A | * | 8/1988 | Czarnecki et al. ............ 454/75 |
| 4,867,499 | A | * | 9/1989 | Stephan et al. .......... 296/180.1 |
| 5,050,922 | A | * | 9/1991 | Falcoff ....................... 296/37.8 |
| 5,522,638 | A | * | 6/1996 | Falcoff et al. ............. 296/37.8 |
| 5,897,155 | A | * | 4/1999 | Kerner et al. .............. 296/37.8 |
| 6,039,378 | A | * | 3/2000 | Bailey ...................... 296/37.16 |
| 6,158,795 | A | * | 12/2000 | Gray et al. ................. 296/37.8 |
| 6,176,534 | B1 | * | 1/2001 | Duncan .................... 296/37.8 |
| 6,186,887 | B1 | * | 2/2001 | Dauvergne .................. 296/208 |
| 6,206,442 | B1 | * | 3/2001 | Breunig ..................... 296/208 |
| 2004/0160089 | A1 | * | 8/2004 | Gupta et al. ................ 296/208 |

FOREIGN PATENT DOCUMENTS

JP             1190527          *    7/1989

* cited by examiner

Primary Examiner—Kiran B. Patel
(74) Attorney, Agent, or Firm—Ralph E. Smith

(57) ABSTRACT

Vehicle storage and ventilation systems are provided. A first system comprises a body including at least one lumen formed therein. A first lumen includes a ventilation lumen for allowing airflow therethrough. A second lumen includes a storage lumen. A lid member is moveable from a closed position substantially covering the storage lumen, to an open position substantially clear of the storage lumen. The ventilation lumen provides a transverse airflow pathway from a first vehicle side to a second vehicle side. A second system comprises means for transverse airflow from a first vehicle side to a second vehicle side, load floor means, and storage means including lid means.

15 Claims, 6 Drawing Sheets

VEHICLE STORAGE AND VENTILATION SYSTEM

RELATED APPLICATION(S)

This application claims the benefit of Provisional Application Ser. No. 60/513,645, filed Oct. 23, 2003.

TECHNICAL FIELD OF THE INVENTION

The present invention relates generally to vehicles. More particularly, the invention relates to a vehicle storage and ventilation system.

BACKGROUND OF THE INVENTION

The rear cargo area of many vehicles may provide a large volume of space that is used to haul luggage, groceries, sporting equipment, and the like. While a large volume of space is advantageous with some types of cargo, more effective space utilization could be achieved by compartmentalizing the available space. Space below the load floor of the vehicle is generally not usable for day-to-day storage. The sub-cargo floor storage of a spare tire and jack is known, however, the cargo floor covering the spare tire and jack is not typically designed for easy removal. Accordingly, it would be desirable to provide a vehicle storage system that may accommodate a spare tire and/or jack.

The storage space in the rear of vehicles is often difficult to fully utilize. The large volume of space above the floor of the storage space is difficult to access making it inconvenient to store and retrieve objects. Much of the space above the load floor is not useable unless the objects stored are stacked on other objects. In addition, the large cargo area is usually not well suited for storing smaller objects, which may readily move and shift during vehicle operation. Therefore, it would be desirable to provide one or more compartmentalized storage area(s) as part of a vehicle storage system.

Vehicle heating, ventilation, and air conditioning (HVAC) systems have conventionally included controls and vents located in or around the front vehicle dashboard. However, as is common in vehicles having conventional HVAC systems, there may be a significant difference in temperature between the front portion and the rear portion of the passenger compartment, especially on days with extreme conditions (e.g., hot, sunny days, and cold days). For vehicles with all of the HVAC vents at the front of the vehicle, uncomfortable temperature conditions for passengers in the rear portion of the vehicle usually arise. Alternatively, if an effort is made to make the rear passengers comfortable, the front passengers may become over-heated or over-cooled.

Accordingly, HVAC controls and vents in a rear portion of the passenger compartment, which are in addition to the conventional HVAC controls and vents provided at the front portion of the passenger compartment, have been developed. Such systems may include parallel front and rear HVAC systems each with, for example, heater core, a compressor, an evaporator, dampers, and a blower fan. Some components may be shared between the HVAC systems, such as the compressor for supplying refrigerant to both the front and rear evaporators. Nevertheless, incorporating virtually two complete HVAC systems for a single vehicle is costly. As such, it would be desirable to provide a strategy for efficiently heating and cooling a vehicle rear portion without the need for a second HVAC system.

Therefore, it would be desirable to provide a vehicle storage and ventilation system that overcomes the aforementioned and other disadvantages.

SUMMARY OF THE INVENTION

A first aspect of the present invention provides a vehicle storage and ventilation system. The system comprises a body including at least one lumen formed therein. A first lumen includes a ventilation lumen for allowing airflow therethrough. A second lumen includes a storage lumen. A lid member is moveable from a closed portion substantially covering the storage lumen, to an open position substantially clear of the storage lumen. The ventilation lumen provides a transverse airflow pathway from a first vehicle side to a second vehicle side.

A second aspect of the invention provides a vehicle storage and ventilation system. The system comprises body means with means for transverse airflow from a first vehicle side to a second vehicle side, storage means including at least one lid means, and load floor means.

The foregoing and other features and advantages of the invention will become further apparent from the following detailed description of the presently preferred embodiments, read in conjunction with the accompanying drawings. The detailed description and drawings are merely illustrative of the invention, rather than limiting, the scope of the invention being defined by the appended claims and equivalents thereof.

DESCRIPTION OF THE PRESENTLY PREFERRED EMBODIMENTS

Figure 1A:
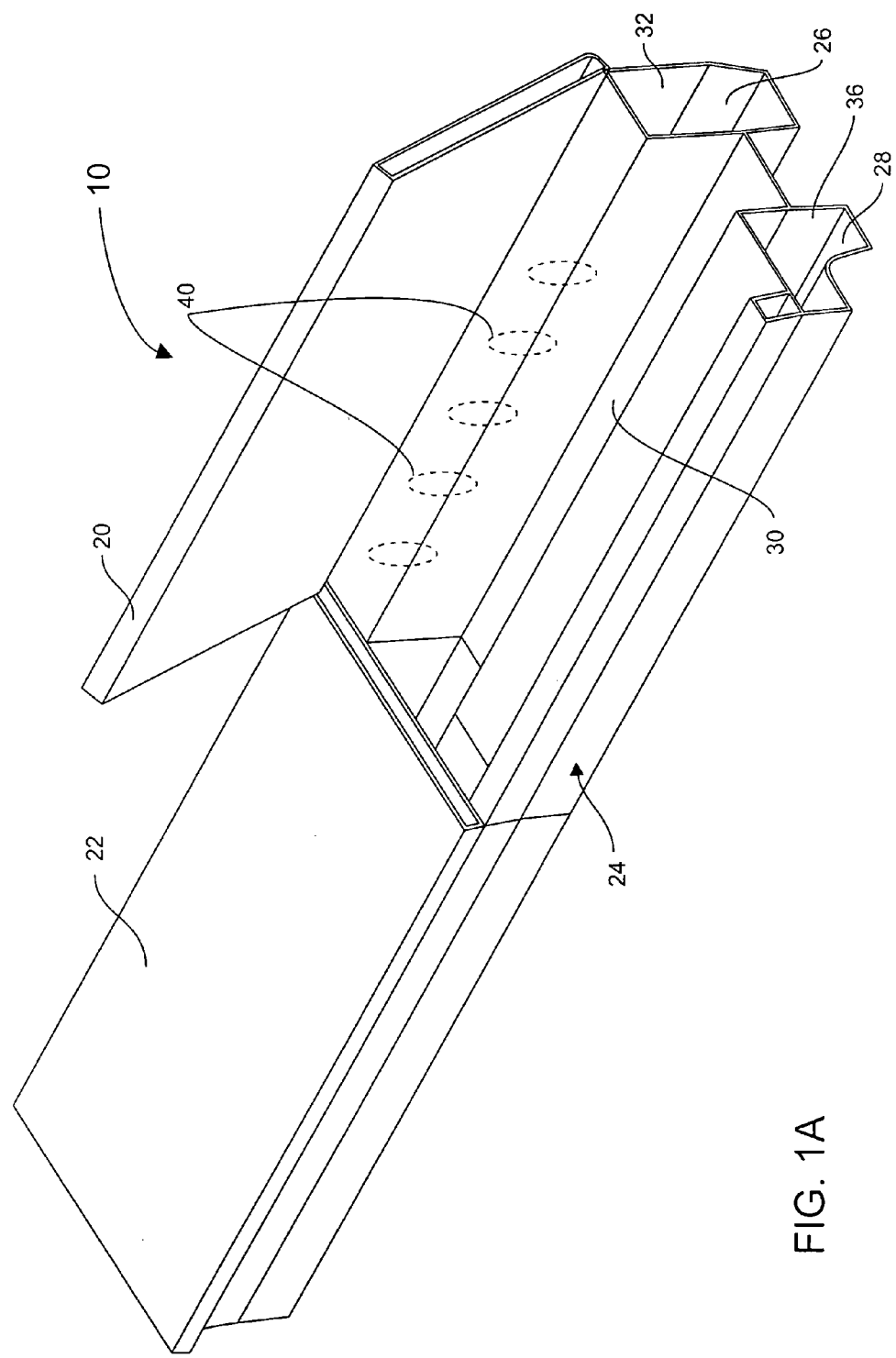
FIG. 1A is a perspective view of a rear vehicle storage and ventilation system in accordance with the present invention, the system shown with one lid member in an "open" configuration.
Figure 1B:
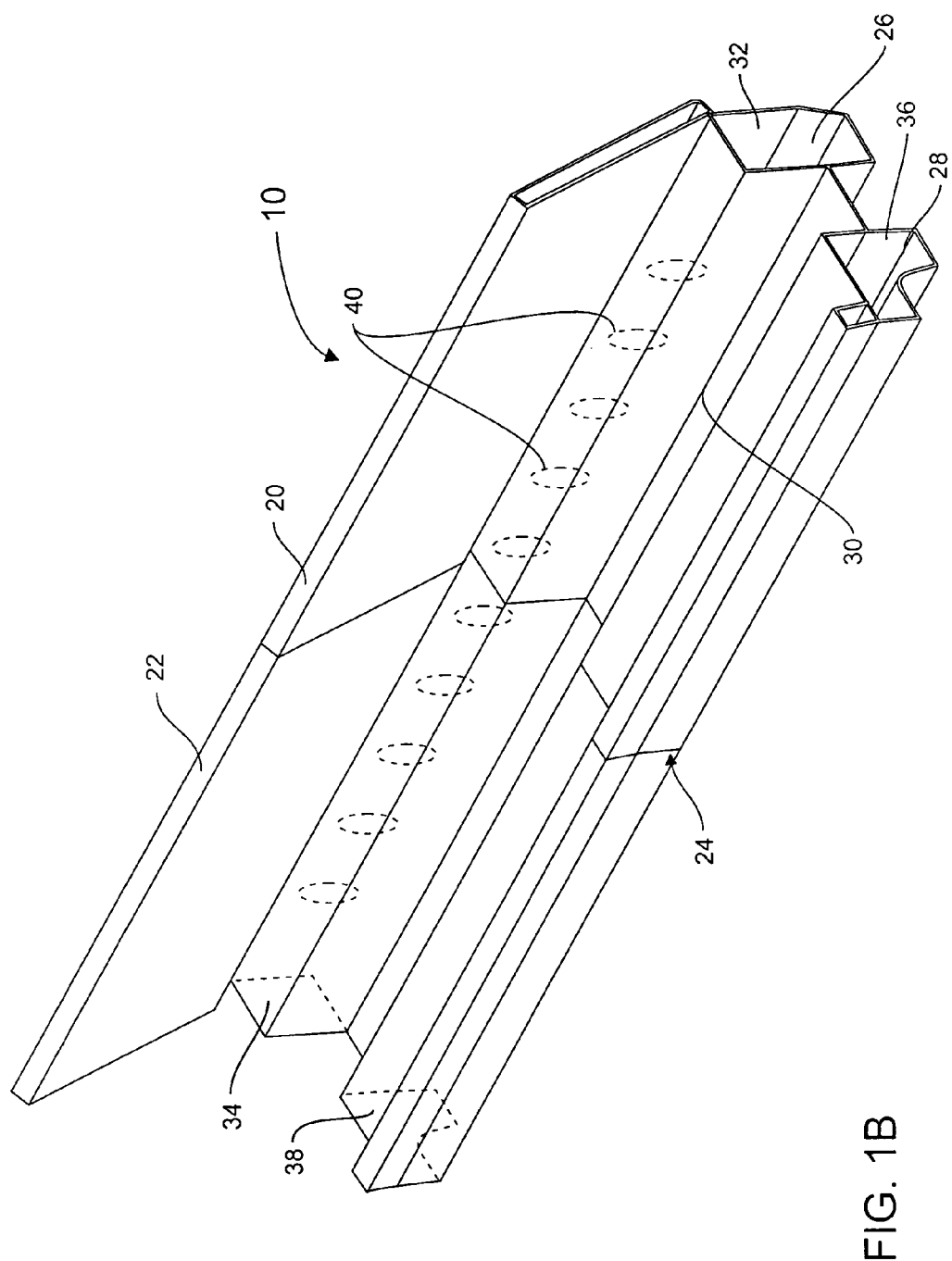
FIG. 1B is a perspective view of the rear vehicle storage and ventilation system shown in FIG. 1A, the system shown with two lid members in an "open" configuration.

Referring to the drawings, wherein like reference numerals refer to like elements, FIG. 1A is perspective view of a rear vehicle storage and ventilation system, shown generally by numeral 10, in accordance with the present invention. System 10 is shown with one lid member 20 in an "open" configuration. System 10 may include a second lid member 22, in this case shown in a "closed" configuration, and a body 24 including at least one lumen, in this case three lumens 26, 28, 30, formed therein. FIG. 1B is a perspective view of the system 10 with the two lid members 20, 22 in the "open" configuration.

In one embodiment of the invention, the lumens 26, 28 comprise ventilation lumens for allowing transverse airflow therethrough, and the lumen 30 comprises a storage lumen. Ventilation lumen 26 provides heated airflow therethrough that is distinct (i.e., isolated) from the ventilation lumen 28, which provides air-conditioned airflow therethrough. Body 24 may include at least one, in this case two, flow openings 32, 36 (see FIG. 1B) formed therein for receiving airflow into the ventilation lumens 26, 28, and at least one, in this case two, flow openings 34, 38 formed therein for allowing airflow out of the ventilation lumens 26, 28. A plurality of vent apertures 40 may be provided in the body 24 allowing airflow to exit out of the ventilation lumen 26. In another embodiment, an alternate number and/or configuration of lumens may provide the transverse airflow and storage. For example, a single lumen may provide both heated and air-conditioned transverse airflow whereas two or more lumens may be provided for storage.

Body 24 may be manufactured substantially from plastic, metal, metal alloy, a composite material, combinations thereof, and the like. Preferably, the body 24 is able to support the storage of cargo placed thereon as is understood in the art for vehicle load floors. Lid members 20, 22 are moveable from the "closed" position substantially covering the storage lumen 30, to the "open" position substantially clear of the storage lumen 30 thereby allowing access to the storage lumen 30. Lid members 20, 22 may be operably attached to the body with at least one attachment member. In one embodiment, one or more hinges may provide means for moveably attaching the lid members 20, 22 to the body 24. In another embodiment, other strategies may be employed for moveably attaching the lid members to the vehicle storage and ventilation system. For example, the lid member(s) may be attached with one or more fasteners, locks, corresponding members (e.g., interlocking or slidable tongue-and-groove) hooks, Velcro®, and the like.

Figure 2:
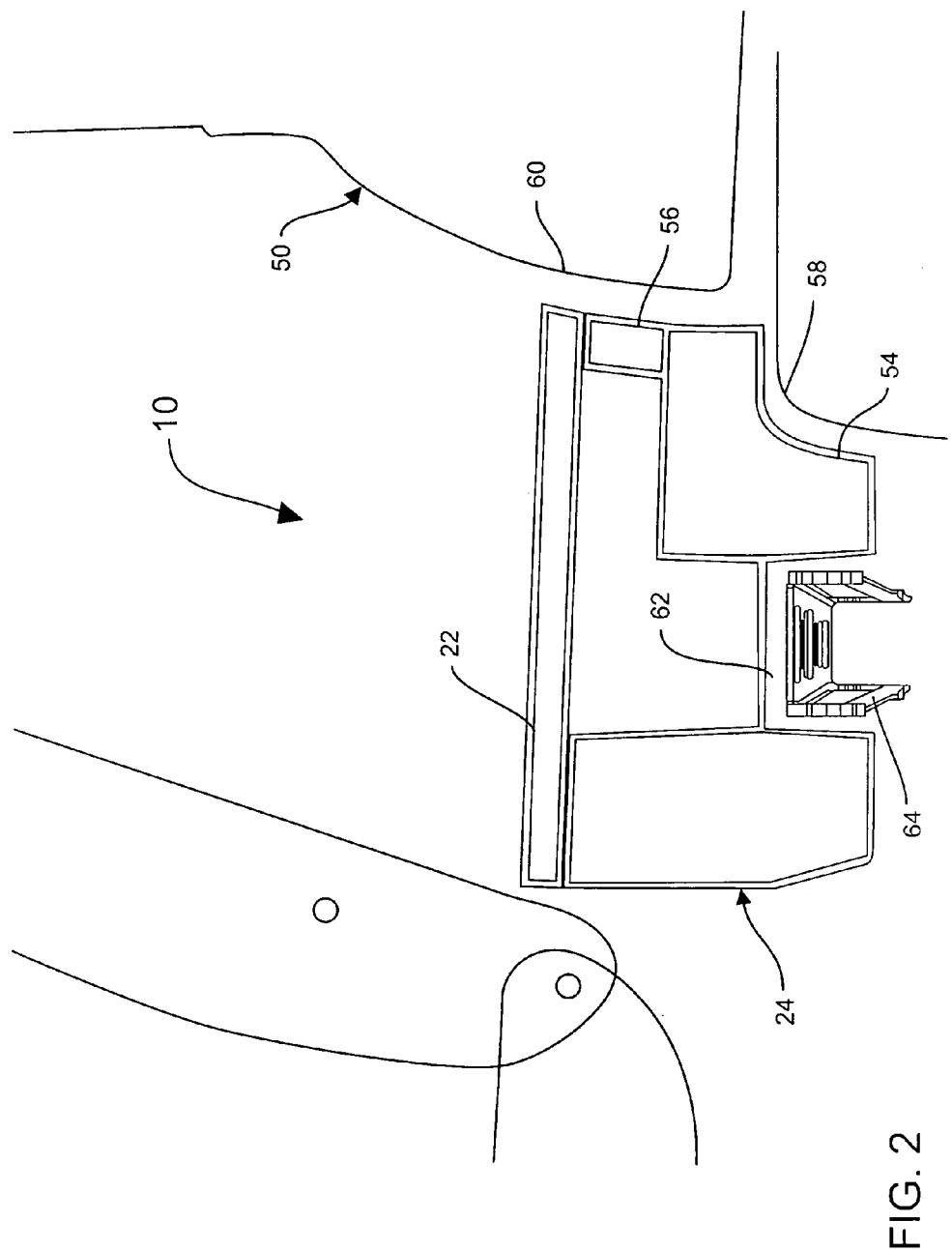
FIG. 2 is a cross sectional view of the rear vehicle storage and ventilation system of FIG. 1A, the system shown positioned in a rear portion of a vehicle with both lid members in a "closed" configuration.

FIG. 2 is a cross sectional view of the vehicle storage and ventilation system 10 shown seated in a rear portion of a vehicle 50. System 10 is shown with both lid members 22 (lid member 20 not visible) in the "closed" configuration. Body 24 may be correspondingly shaped to vehicle 50 rear cargo area. For example, the body 24 may include curved portions 54, 56 complementary to curved portion 58, 60 on the vehicle 50 to produce a fit. Those skilled in the art will recognize that the body 24 may include a variety of shapes so that the system 10 may be adapted for use at numerous locations within the vehicle 50 other than just the rear cargo area.

Figure 3:
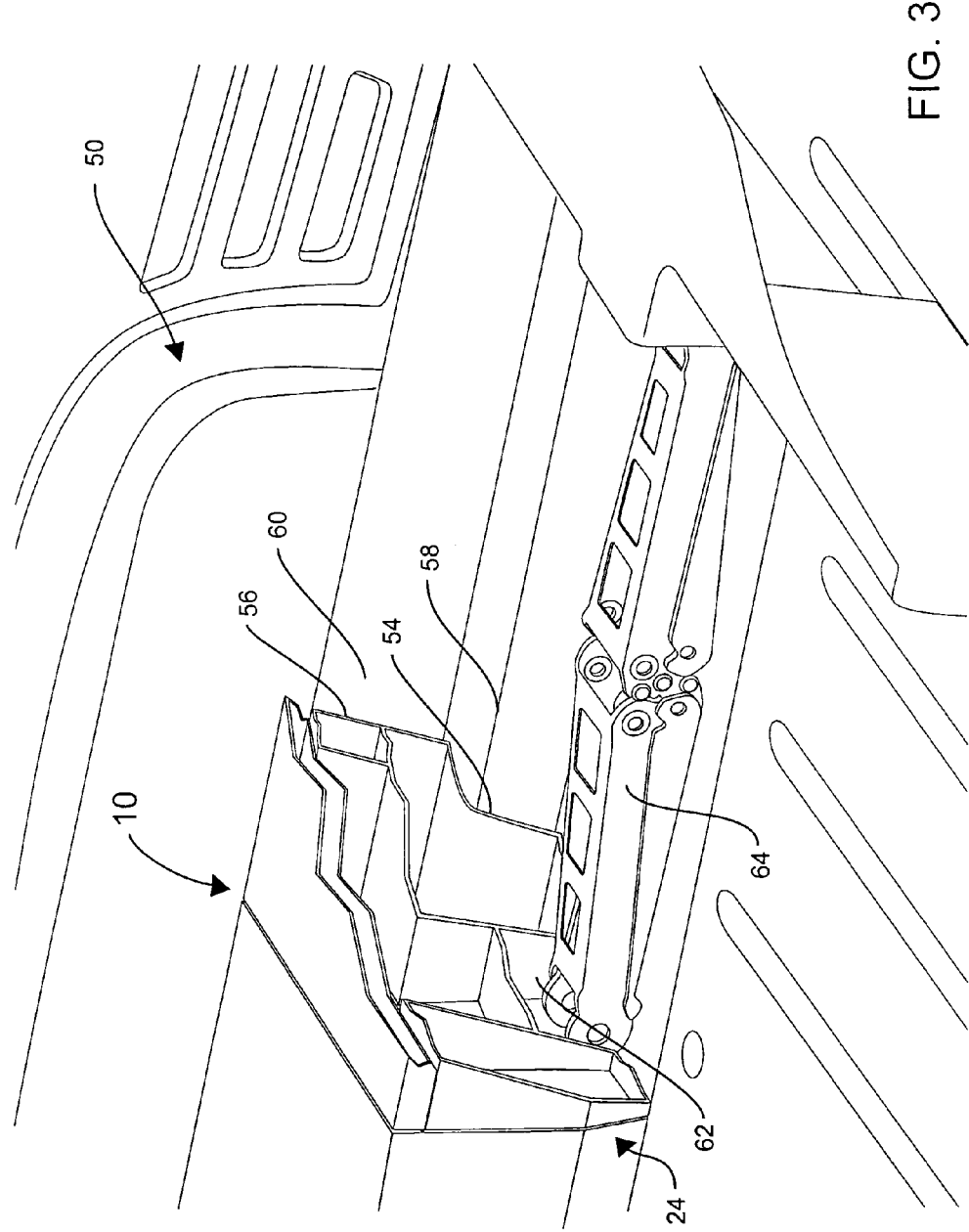
FIG. 3 is a partial cut-away view of the rear vehicle storage and ventilation system of FIG. 2.

As also shown in FIG. 3, the body 24 may further include a lumen 62 for receiving one or more storage items, such as a spare tire, jack 64, and the like. Lumen 62 may be correspondingly shaped to the storage item, in this case the jack 64, thereby maximizing efficiency of space usage. In one embodiment, the system 10 may be removable from the vehicle 50 thereby allowing, for example, access to the storage item, maintenance of the system 10, temporary increase in storage space, and the like. In another embodiment, the system 10 may be fixably attached to the vehicle 50 (e.g., with screws, fasteners, locks, corresponding members, hooks, Velcro®, etc.) and the storage item(s) may be accessed, for example, through an aperture (not shown) formed in the body 24. Those skilled in the art will recognize that the removability and means for accessing the storage item(s) may vary and is not limited to the embodiments described.

Figure 4:
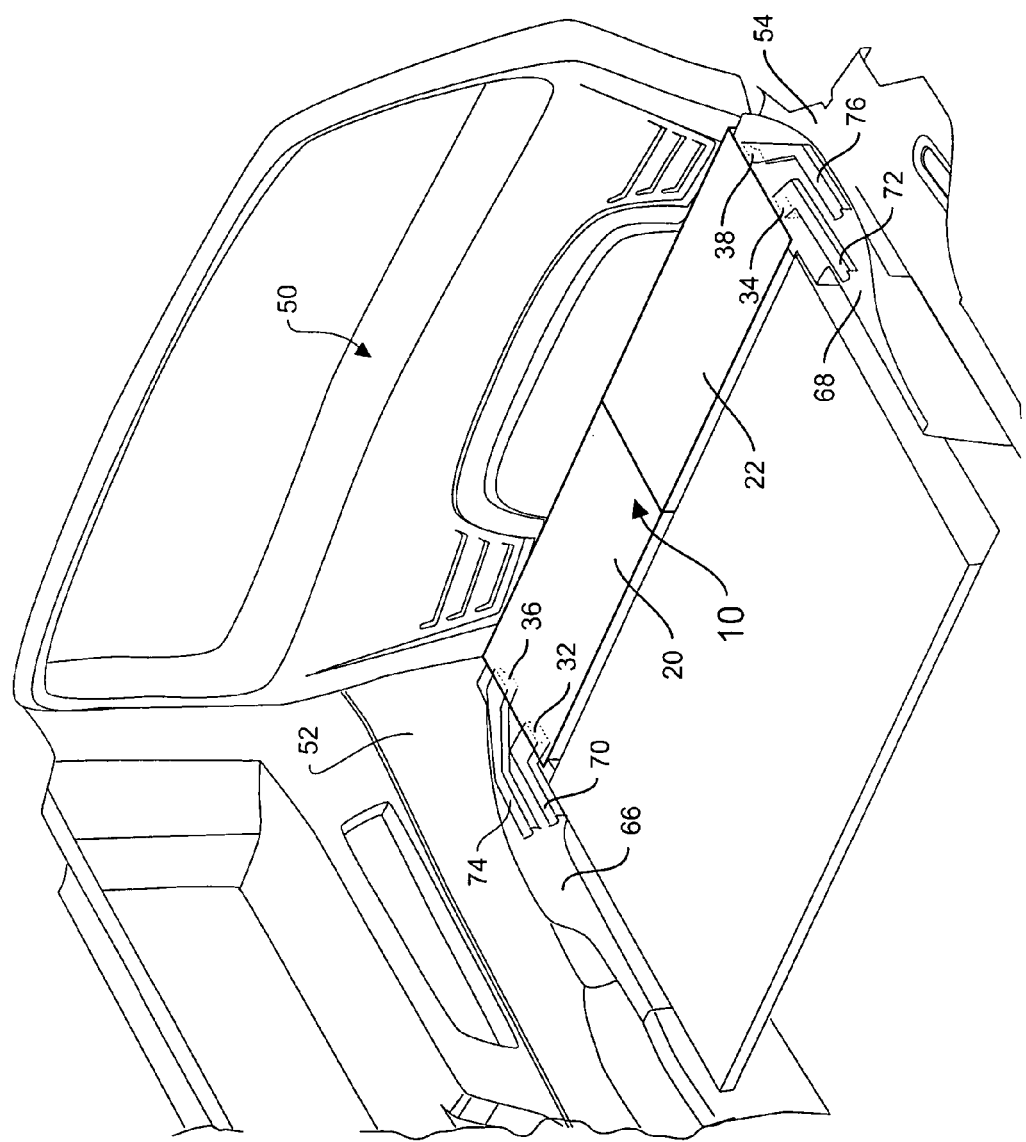
FIG. 4 is a perspective view of the rear vehicle storage and ventilation system of FIG. 2.

FIG. 4 is a perspective view of the system 10 shown positioned in a rear portion of a vehicle 50. System 10 is shown with both lid members 20, 22 in the "closed" configuration and positioned between a first wing piece 66 and a second wing piece 68. System 10 provides transverse airflow from a first vehicle side 52 to a second vehicle side 54. Wing pieces 66, 68 may include ducts 70, 72, 74, 76 for providing airflow into and out of the flow openings 32, 34, 36, 38, respectively. Ventilation lumens (not visible) may be in fluid communication with a vehicle heating system, a ventilation system, or a cooling system.

In one embodiment, air flow from the vehicle heating system (not shown) may travel through the duct 70, into the flow opening 32, through the heated airflow ventilation lumen, out of the flow opening 34, and into the duct 72. A portion of the heated air flow may exit the ventilation lumen through the vent apertures (not visible) to provide increased airflow throughout the rear portion of the vehicle 50. Air flow from the vehicle cooling system (not shown) may travel through the duct 74, into the flow opening 36, through the air-conditioning ventilation lumen, out of the flow opening 38, and into the duct 76. Air flow from the ducts 72, 76 may then exit out of one or more vents positioned at the second vehicle side. In another embodiment, numerous duct, flow opening, and ventilation lumen configurations may be provided as part of the system 10 for providing transverse airflow from the first vehicle side 52 to the second vehicle side 54. For example, a single ventilation lumen may be used to conduct both heated and air-conditioned airflow. Those skilled in the art will recognize that the present invention is not limited to the embodiments described herein.

Figure 5:
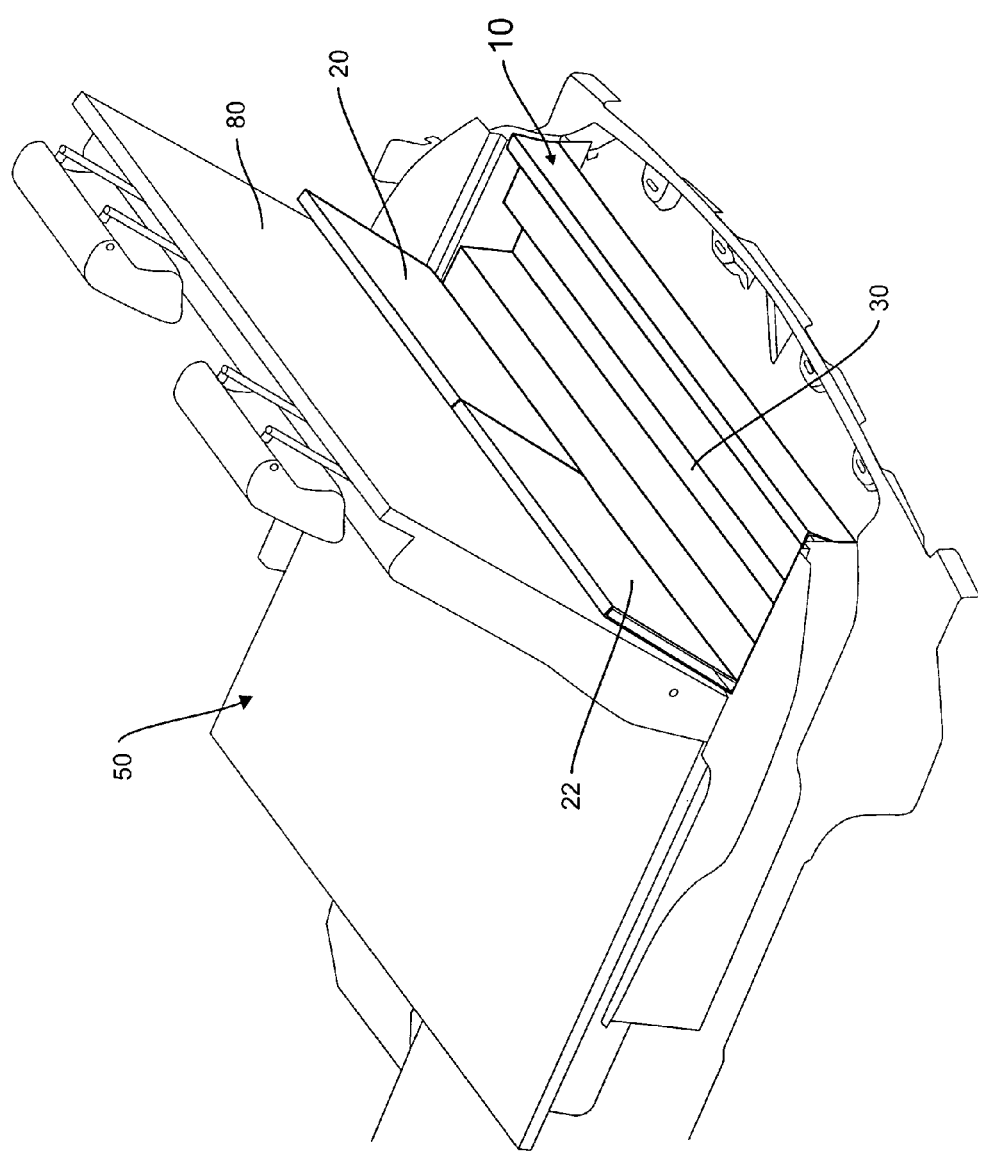
FIG. 5 is a perspective view of the rear vehicle storage and ventilation system of FIG. 1B, the system shown positioned in a rear portion of a vehicle against a rear seat.

FIG. 5 is a perspective view of the system 10 shown positioned in a rear portion of a vehicle 50 against a rear seat 80. The two lid members 20, 22 are shown in the "open" configuration. Storage lumen 30 may be used to store cargo items. As the system 10 provides transverse airflow from first vehicle side 52 to the second vehicle side 54, the use of parallel front and rear heating, ventilation, and air conditioning (HVAC) systems is not required. System 10 may allow airflow to be adequately distributed throughout the rear portion of the vehicle 50 without the need for dual HVAC systems. As such, the overall cost and complexity of the HVAC system may be reduced.

While the embodiments of the invention disclosed herein are presently considered to be preferred, various changes and modifications can be made without departing from the spirit and scope of the invention. The vehicle storage and ventilation system and vehicle are not limited to any particular design or arrangement. For example, the body, lumens, lid member(s) with attachment means, transverse airflow pathway, flow openings, vent aperture(s), and vehicle ducts may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A vehicle storage and ventilation system comprising:
   a body including at least two lumens formed therein;
      wherein a first lumen comprises a ventilation lumen for allowing airflow therethrough, and a second lumen comprises a storage lumen; and
   at least one lid member moveable from a closed position substantially covering the storage lumen, to an open position substantially clear of the storage lumen,
      wherein the ventilation lumen provides a transverse airflow pathway from a first vehicle side to a second vehicle side.

2. The system of claim 1 wherein the body is manufactured substantially from one or more materials selected from a group consisting of a plastic, a metal, a metal alloy, a composite.

3. The system of claim 1 wherein the ventilation lumen provides heated airflow.

4. The system of claim 1 wherein the ventilation lumen provides air-conditioned airflow.

5. The system of claim 1 wherein the ventilation lumen comprises a first lumen for heated airflow distinct from a second lumen for air-conditioned airflow.

6. The system of claim 1 wherein the body is correspondingly shaped to a vehicle rear cargo area.

7. The system of claim 1 wherein the body comprises a third lumen for receiving at least one storage item.

8. The system of claim 7 wherein the storage item comprises a spare tire or a jack.

9. The system of claim 1 wherein the body includes at least one vent aperture formed therein for allowing airflow to exit the ventilation lumen.

10. The system of claim 1 wherein the lid member is operably attached to the body with at least one attachment member.

11. The system of claim 1 wherein the ventilation lumen is in fluid communication with at least one of a vehicle heating system, a ventilation system, and a cooling system.

12. The system of claim 1 wherein the vehicle storage and ventilation system is removable.

13. The system of claim 1 wherein the body includes at least one flow opening formed therein for receiving airflow into the ventilation lumen, and at least one flow opening formed therein for allowing airflow out of the ventilation lumen.

14. The system of claim 13 further comprising a first duct for providing airflow to a first flow opening and a second duct for receiving airflow from a second flow opening.

15. The system of claim 14 wherein a portion of the first duct is formed within a first wing piece, and a portion of the second duct is formed within a second wing piece.

* * * * *